United States Patent
Arden et al.

(10) Patent No.: US 9,910,438 B1
(45) Date of Patent: Mar. 6, 2018

(54) AUTONOMOUS VEHICLE BEHAVIOR WHEN WAITING FOR PASSENGERS

(71) Applicant: Waymo LLC, Mountain View, CA (US)

(72) Inventors: Jennifer Arden, San Francisco, CA (US); Anne Kristiina Aula, Mountain View, CA (US); Brian Douglas Cullinane, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 141 days.

(21) Appl. No.: 14/549,999

(22) Filed: Nov. 21, 2014

Related U.S. Application Data

(60) Provisional application No. 62/002,319, filed on May 23, 2014.

(51) Int. Cl.
| | |
|---|---|
| *G06Q 50/30* | (2012.01) |
| *G05D 1/02* | (2006.01) |
| *G07C 5/00* | (2006.01) |

(52) U.S. Cl.
CPC .......... *G05D 1/0212* (2013.01); *G06Q 50/30* (2013.01); *G07C 5/008* (2013.01)

(58) Field of Classification Search
CPC .............................. G06Q 50/30; G05D 1/0212
(Continued)

(56) References Cited

U.S. PATENT DOCUMENTS

| | | |
|---|---|---|
| 4,361,202 A | 11/1982 | Minovitch |
| 4,465,155 A | 8/1984 | Collins |

(Continued)

FOREIGN PATENT DOCUMENTS

| | | |
|---|---|---|
| EP | 2573720 A1 | 3/2013 |
| EP | 2629269 A1 | 8/2013 |

(Continued)

OTHER PUBLICATIONS

Federal Transit Administration, Topic Guides on ADA Transportation—Topic Guide 6, On-Time Performance, Jul. 2011, dredf.org <http://dredf.org/ADAtg/OTP.shtml>.*
Federal Transit Administration, Topic Guides on ADA Transportation—Topic Guide 7, No-Shows, Jul. 2011, dredf.org <http://dredf.org/ADAtg/noshow.shtml>.*
UberPeople.NET, Wait Time for Riders, May 12, 2014, UberPeople. NET—Independent Community of Rideshare Drivers <https://uberpeople.net/threads/wait-time-for-riders.244/>.*
(Continued)

*Primary Examiner* — Kimberly S Berona
*Assistant Examiner* — Nadeem Odeh
(74) *Attorney, Agent, or Firm* — Lerner, David, Littenberg, Krumholz & Mentlik, LLP

(57) ABSTRACT

Aspects of the present disclosure relate to a vehicle having one or more computing devices that may receive instructions to pick up a passenger at a location, determine when the vehicle is within a first distance of the location, provide a first notification that the vehicle is within the first distance, and stop the vehicle. When the vehicle is stopped, the computing device may initiate a countdown. When a client computing device associated with the passenger has not been authenticated, the computing devices may provide a second notification based on a first amount of time remaining in the countdown and a third notification indicating that the trip is cancelled based on a second amount of time remaining in the countdown less than the first amount of time. Once the third notification is provided, the computing devices move the vehicle from the where the vehicle is stopped without the passenger.

20 Claims, 16 Drawing Sheets

(58) Field of Classification Search
USPC .......................................................... 701/23
See application file for complete search history.

(56) References Cited

U.S. PATENT DOCUMENTS

| | | | |
|---|---|---|---|
| 5,293,160 | A | 3/1994 | Kurozu et al. |
| 5,367,456 | A | 11/1994 | Summerville et al. |
| 5,640,323 | A | 6/1997 | Kleimenhagen et al. |
| 6,236,333 | B1 | 5/2001 | King |
| 6,298,304 | B1 | 10/2001 | Theimer |
| 6,591,172 | B2 | 7/2003 | Oda et al. |
| 6,680,675 | B1 | 1/2004 | Suzuki |
| 6,963,794 | B2 | 11/2005 | Geber et al. |
| 7,113,864 | B2 | 9/2006 | Smith et al. |
| 7,859,386 | B2 | 12/2010 | Lundkvist |
| 7,928,829 | B2 | 4/2011 | Hermann |
| 8,044,771 | B2 | 10/2011 | Nakajima et al. |
| 8,126,450 | B2 | 2/2012 | Howarter et al. |
| 8,352,112 | B2 | 1/2013 | Mudalige |
| 8,494,765 | B2 | 7/2013 | Konet et al. |
| 8,532,862 | B2 | 9/2013 | Neff |
| 8,676,430 | B1 | 3/2014 | Ferguson et al. |
| 8,688,306 | B1 | 4/2014 | Nemec et al. |
| 8,718,861 | B1 | 5/2014 | Montemerlo et al. |
| 8,736,438 | B1 | 5/2014 | Vasquez et al. |
| 8,768,565 | B2 | 7/2014 | Jefferies et al. |
| 8,880,270 | B1 | 11/2014 | Ferguson et al. |
| 8,935,034 | B1 | 1/2015 | Zhu et al. |
| 9,060,003 | B2 | 6/2015 | Wang et al. |
| 9,191,514 | B1 | 11/2015 | Cavanaugh et al. |
| 2004/0036622 | A1 | 2/2004 | Dukach et al. |
| 2004/0249569 | A1 | 12/2004 | Oh |
| 2004/0260470 | A1 | 12/2004 | Rast |
| 2005/0153707 | A1* | 7/2005 | Ledyard ................ G01S 5/0018 455/456.1 |
| 2006/0253251 | A1 | 11/2006 | Puranik et al. |
| 2007/0073472 | A1 | 3/2007 | Odinak et al. |
| 2008/0061931 | A1 | 3/2008 | Hermann |
| 2008/0136674 | A1 | 6/2008 | Jang et al. |
| 2008/0195428 | A1* | 8/2008 | O'Sullivan ............ G06Q 10/00 705/6 |
| 2008/0266139 | A1 | 10/2008 | Kim |
| 2008/0312817 | A1 | 12/2008 | Kawauchi |
| 2009/0171566 | A1 | 7/2009 | Morimoto et al. |
| 2009/0187538 | A1 | 7/2009 | Grun |
| 2009/0216600 | A1 | 8/2009 | Hill |
| 2009/0248231 | A1 | 10/2009 | Kamiya |
| 2009/0287367 | A1 | 11/2009 | Salinger |
| 2010/0007525 | A1 | 1/2010 | Shanbhag et al. |
| 2010/0017084 | A1 | 1/2010 | Riegel |
| 2010/0070168 | A1 | 3/2010 | Sumcad et al. |
| 2010/0075656 | A1 | 3/2010 | Howarter et al. |
| 2010/0106397 | A1 | 4/2010 | Van Essen |
| 2010/0117585 | A1 | 5/2010 | Fitch et al. |
| 2010/0183409 | A1 | 7/2010 | Checketts et al. |
| 2010/0256836 | A1 | 10/2010 | Mudalige |
| 2010/0284771 | A1 | 11/2010 | Stierler |
| 2010/0286845 | A1 | 11/2010 | Rekow et al. |
| 2011/0099040 | A1* | 4/2011 | Felt ..................... G06F 17/3087 705/7.12 |
| 2011/0112969 | A1 | 5/2011 | Zaid et al. |
| 2011/0144865 | A1 | 6/2011 | Niemz |
| 2011/0144980 | A1 | 6/2011 | Rysenga |
| 2011/0191019 | A1 | 8/2011 | Holsinger et al. |
| 2011/0301985 | A1* | 12/2011 | Camp .................. G06Q 10/02 705/5 |
| 2012/0041675 | A1* | 2/2012 | Juliver ................. G06Q 10/08 701/465 |
| 2012/0072051 | A1 | 3/2012 | Koon et al. |
| 2012/0083960 | A1 | 4/2012 | Zhu et al. |
| 2012/0173080 | A1 | 7/2012 | Cluff |
| 2012/0188100 | A1 | 7/2012 | Min et al. |
| 2012/0271500 | A1 | 10/2012 | Tsimhoni et al. |
| 2013/0024049 | A1 | 1/2013 | Yoshioka et al. |
| 2013/0231824 | A1* | 9/2013 | Wilson ................. G05D 1/0088 701/26 |
| 2013/0238783 | A1 | 9/2013 | Alexander et al. |
| 2013/0289825 | A1 | 10/2013 | Noh et al. |
| 2013/0321178 | A1 | 12/2013 | Jameel et al. |
| 2014/0135598 | A1 | 5/2014 | Weidl et al. |
| 2014/0156182 | A1 | 6/2014 | Nemec et al. |
| 2014/0172292 | A1 | 6/2014 | McGee et al. |
| 2014/0172727 | A1* | 6/2014 | Abhyanker ........ G06Q 30/0645 705/307 |
| 2014/0189096 | A1 | 7/2014 | Miller et al. |
| 2014/0365250 | A1 | 12/2014 | Ikeda et al. |
| 2014/0380424 | A1 | 12/2014 | Thompson |
| 2015/0073645 | A1 | 3/2015 | Davidsson et al. |
| 2015/0081362 | A1* | 3/2015 | Chadwick ............. G06Q 50/30 705/7.14 |
| 2015/0127191 | A1 | 5/2015 | Misra et al. |
| 2015/0148989 | A1 | 5/2015 | Cooper et al. |
| 2015/0149320 | A1 | 5/2015 | Smirin |
| 2015/0185034 | A1 | 7/2015 | Abhyanker |
| 2015/0219464 | A1 | 8/2015 | Beaurepaire et al. |
| 2015/0321641 | A1 | 11/2015 | Abou Mahmoud et al. |
| 2015/0334187 | A1 | 11/2015 | Pesola et al. |
| 2015/0338849 | A1 | 11/2015 | Nemec et al. |
| 2015/0339928 | A1 | 11/2015 | Ramanujam |
| 2015/0369621 | A1 | 12/2015 | Abhyanker |
| 2015/0370251 | A1 | 12/2015 | Siegel et al. |
| 2016/0019790 | A1 | 1/2016 | Tobolski et al. |
| 2016/0027307 | A1 | 1/2016 | Abhyanker et al. |
| 2016/0042303 | A1* | 2/2016 | Medina ................. G06Q 10/02 705/5 |
| 2016/0116293 | A1 | 4/2016 | Grover et al. |
| 2016/0125735 | A1 | 5/2016 | Tuukkanen |
| 2016/0203377 | A1 | 7/2016 | Irie et al. |
| 2016/0301698 | A1* | 10/2016 | Katara ................. G07B 13/02 |
| 2017/0075358 | A1* | 3/2017 | Zhang .................. G06Q 10/06 |

FOREIGN PATENT DOCUMENTS

| | | | |
|---|---|---|---|
| JP | 2001234653 A | | 8/2001 |
| WO | 2003080391 A2 | | 10/2003 |
| WO | WO 2015169204 A1 * | 11/2015 | ............. G06Q 10/06 |

OTHER PUBLICATIONS

UberPeople.NET, How Long Do You Wait? Post Your Times, Aug. 20, 2014, UberPeople.NET—Independent Community of Rideshare Drivers <https://uberpeople.net/threads/how-long-do-you-wait-post-your-times.2162/>.*

Quora, In Between Rides, Is it in an Uber (Company) Drivers Best Interest to Stay Put or Drive Around?, Feb. 25, 2014, Quora.com—A Place to Share Knowledge and Better Understand the World <https://www.quora.com/In-between-rides-is-it-in-an-Uber-company-drivers-best-interest-to-stay-put-or-drive-around>.*

North Las Vegas—Code of Ordinance, Title 10 / Ch. 10.48—Stopping, Standing or Parking Generally, May 21, 2013, City of North Las Vegas Website <https://library.municode.com/nv/north_las_vegas/codes/code_of_ordinances/196159?nodeId=TIT10VETR_CH10.48STSTPAGE_10.48.180STPACULOZO>.*

International Search Report and Written Opinion for Application No. PCT/US2015/032181 dated Sep. 4, 2015.

Junqing Wei et al., "Towards a viable autonomous driving research platform", In: Intelligent Vehicles Symposium (IV), 2013 IEEE, Jun. 23-26, 2013, pp. 763-770.

International Search Report and Written Opinion for Application No. PCT/US2015/032171 dated Sep. 17, 2015.

McKeegan, "Autonomous taxi can be hailed with and iPad app", Oct. 14, 2010, downloaded from <http://www.gizmag.com/autonomous-taxi-ipad/16649/>.

Baydere et al., "MR302: The Future of the Automobile: Car-Sharing Service using Autonomous Automobiles" Spring 2014.

McFadden, Colin-Druce, "Autonomous car concept swaps steering wheel for gesture controls", <http://www.dvice.com/2014-3-12/autonomous-car-concept-swaps-steering-wheel-gesture-controls>, Mar. 12, 2014.

(56) References Cited

OTHER PUBLICATIONS

Ridden, Paul, "ATNMBL—The concept car with no steering wheel, brake pedal or driver's seat", <http://www.gizmag.com/atnmbl-autonomous-concept-passenger-transport/15877/>, Jul. 29, 2010.
Fagnant et al., "The travel and environmental implications of shared autonomous vehicles, using agent-based model scenarios", Transportation Research Part C, vol. 40 (2014): 1-13.
Ranoa, "Infographic: The car that drives itself", Los Angeles Times, copyright 2014,<http://www.latimes.com/la-sci-g-google-self-driving-car-20140528-htmlstory.html>.
Bluetooth® Keyless, "FAQs about the Bluetooth® Passive Keyless Entry Module", copyright 2014, downloaded from <http://bluetoothkeyless.info/bluetooth-keyless-information/>.
Chevrolet, "OnStar Remote Link™: Control you Chevy even when you're not driving", 2014 downloaded from <http://www.chevrolet.com/onstar-remotelink.html>.
Goodwin, "Add-on module auto-unlocks your car when your phone is near", c|net, Nov. 19, 2013, downloaded from <http://www.cnetcom/news/add-on-module-auto-unlocks-your-car-when-your-phone-is-near/>.

\* cited by examiner

AUTONOMOUS VEHICLE BEHAVIOR WHEN WAITING FOR PASSENGERS

CROSS REFERENCE TO RELATED APPLICATIONS

The present application claims the benefit of the filing date of U.S. Provisional Patent Application No. 62/002,319 filed May 23, 2014, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination.

BRIEF SUMMARY

One aspect of the disclosure provides a method. The method includes receiving, by one or more computing devices, instructions to pick up a passenger at a pickup location for a trip; determining, by the one or more computing devices, when the vehicle is within a first distance of the pickup location; when the vehicle is within the first distance, providing, by the one or more computing devices, a first notification that the vehicle is within the first distance of the pickup location; stopping, by the one or more computing devices, the vehicle at a given location based on the pickup location; when the vehicle is stopped at the given location, initiating, by the one or more computing devices, a countdown; when a client computing device associated with the passenger has not been authenticated, providing, by the one or more computing devices, a second notification based on a first amount of time remaining in the countdown; when the client computing device associated with the passenger has not been authenticated, providing, by the one or more computing devices, a third notification indicating that the trip is cancelled based on a second amount of time remaining in the countdown less than the first amount of time; and once the countdown has completed, moving, by the one or more computing devices, the vehicle from the given location without the passenger.

In one example, the first distance is defined in an amount of time for the vehicle to reach the pickup location. In another example, the second notification indicates that the vehicle is preparing to leave the given location. In another example, the method also includes before the countdown is finished, determining that the vehicle must leave the given location, and moving the vehicle from the given location within the second distance of the pickup location. In this example, the method also includes stopping, by the one or more computing devices, the vehicle a second time based on the pickup location, and when the vehicle is stopped the second time, restarting the countdown. In another example, the method also includes, before starting the countdown, determining a length of time for the countdown based on a distance between the pickup location and the given location. In another example, the method also includes, receiving a request for more time initiated by the client computing device; and adjusting an amount of time remaining in the countdown based on the request. In another example, the method also includes, before moving the vehicle, waiting until second instructions to pick up a second passenger at a second pickup location for a second trip are received by the one or more computing devices.

Another aspect of the disclosure provides a system. The system includes one or more computing devices configured to receive instructions to pick up a passenger at a pick up location for a trip; determine when the vehicle is within a first distance of the pickup location; when the vehicle is within the first distance, provide a first notification that the vehicle is within the first distance of the pickup location; stop the vehicle at a given location based on the pickup location; when the vehicle is stopped at the given location, initiate a countdown; when a client computing device associated with the passenger has not been authenticated, provide a second notification based on a first amount of time remaining in the countdown; when the client computing device associated with the passenger has not been authenticated, provide a third notification indicating that the trip is cancelled based on a second amount of time remaining in the countdown less than the first amount of time; and once the countdown has completed, move the vehicle from the given location without the passenger.

In one example, the first distance is defined in an amount of time for the vehicle to reach the pickup location. In another example, the first notification indicates that the vehicle is preparing to leave the given location. In another example, the one or more computing devices are also configured to, before the countdown is finished, determine that the vehicle must leave the given location, and move the vehicle from the given location within the second distance of the pickup location. In this example, the one or more computing devices are also configured to stop the vehicle a second time based on the pickup location and, when the vehicle is stopped the second time, restart the countdown. In another example, the one or more computing devices are also configured to, before starting the countdown, determine a length of time for the countdown based on a distance between the pickup location and the given location. In another example, the one or more computing devices are also configured to receive a request for more time initiated by the client computing device, and adjust an amount of time remaining in the countdown based on the request. In another example, the system also includes the vehicle. In another example, the one or more computing devices, before moving the vehicle, waiting until second instructions to pick up a second passenger at a second pickup location for a second trip are received.

A further aspect of the disclosure provides a non-transitory computer-readable medium on which instructions are stored. The instructions, when executed by one or more processors cause the one or more processors to perform a method. The method includes receiving instructions to pick up a passenger at a pickup location for a trip; determining when the vehicle is within a first distance of the pickup location; when the vehicle is within the first distance, providing a first notification that the vehicle is within the first distance of the pickup location; stopping the vehicle at a given location based on the pickup location; when the vehicle is stopped at the given location, initiating a countdown; when a client computing device associated with the passenger has not been authenticated, providing a second notification based on a first amount of time remaining in the countdown; when the client computing device associated with the passenger has not been authenticated, providing a third notification indicating that the trip is cancelled based on a second amount of time remaining in the countdown less than the first amount of time; and, once the countdown has completed, moving the vehicle from the given location without the passenger.

In one example, the method also includes, before the countdown is finished, determining that the vehicle must leave the given location, and moving the vehicle from the given location within the second distance of the pickup location. In another example, the method also includes stopping the vehicle a second time based on the pickup location, and when the vehicle is stopped the second time, restarting the countdown.

DETAILED DESCRIPTION

Overview

Figure 1:
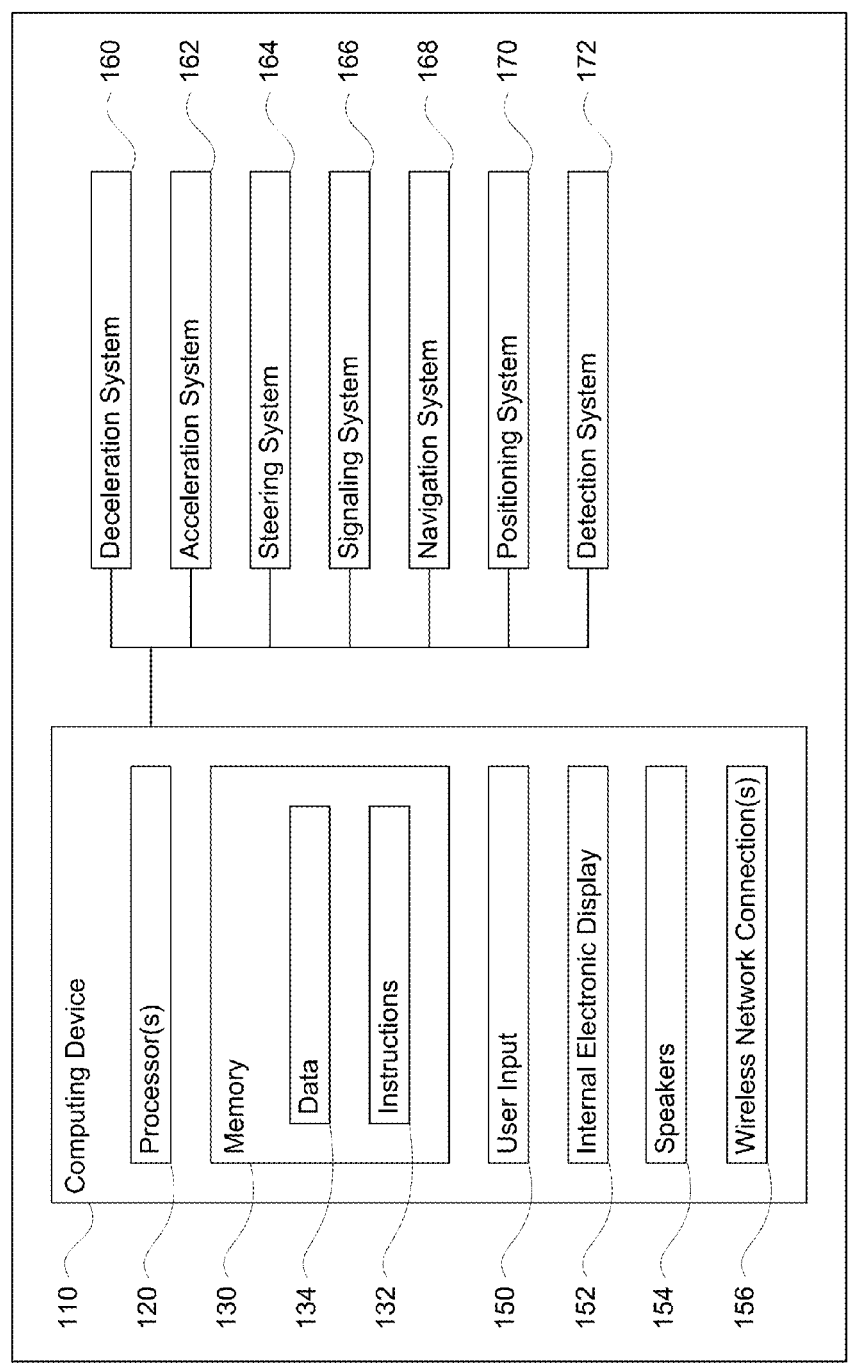
FIG. 1 is a functional diagram of an example vehicle in accordance with an exemplary embodiment.

The technology relates to autonomous vehicle for maneuvering a user or passenger to a destination, for example taking a trip, autonomously. In order to do so, the user may provide a pickup location and a destination location for the trip to a centralized dispatching system via a client computing device, such as a mobile phone. The centralized dispatching system may then dispatch a vehicle to the pickup location. However, once the vehicle has arrived at the pickup location, the vehicle cannot wait indefinitely for the passenger. As such, the vehicle may take various actions to notify and interact with the passenger regarding the status of the vehicle.

For example, once a vehicle is dispatched to a pickup location, the passenger may receive a notification including information about an estimated time of arrival for the vehicle via the passenger's client computing device. Once the vehicle is within some distance in time or space, from the pickup location, the passenger may receive another notification that the vehicle will be arriving or has actually arrived.

Once the vehicle has parked or come to a stop, presumably within a short distance of the pickup location, the vehicle's computing devices may initiate a countdown. As an example, this countdown may be a predetermined amount of time, to allow the passenger ample time to reach the vehicle. During this countdown time, the vehicle will try to authenticate the passenger, for example, via a Bluetooth or other communication link with the passenger's client computing device. If the passenger is authenticated, the doors of the vehicle may unlock, the passenger may enter the vehicle, and the vehicle may begin the trip to the destination location.

If the vehicle is unable to authenticate the passenger based on the countdown, the passenger may receive a third notification. The further notification may indicate that the vehicle is about to leave. The timing of the second notification may coincide with an amount of time left in the countdown. As an example, the notification may be provided half way through the countdown, after a fixed amount of time has passed or some predetermined amount of time before the end of the countdown.

If after this third notification, the vehicle has not yet authenticated the passenger, the passenger may receive a fourth notification. The fourth notification may indicate to the passenger that the trip has been cancelled. As with the third notification, the timing of the fourth notification may coincide with an amount of time left in the countdown. As an example, the fourth notification may be provided half way through the countdown, after a fixed amount of time has passed or some predetermined amount of time before the end of the countdown.

The notifications provided to the client computing device may be initially generated by the vehicle. In some examples, the notifications may be routed through or generated by the centralized dispatching system and subsequently sent to the passenger's client computing device.

The features described herein provide for a simplified and clear communications with the passenger regarding the status of a vehicle. By doing so, the passenger is able to understand when the vehicle will be arriving and also indicate to the passenger how long the vehicle will be able to wait. This, in turn, may reduce the likelihood of a passenger missing a vehicle or a vehicle waiting indefinitely for a passenger.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as BLUETOOTH, BLUETOOTH low energy (LE), cellular connections, as well as various configurations and protocols including the Internet, World Wide Web, intranets, virtual private networks, wide area networks, local networks, private networks using communication protocols proprietary to one or more companies, Ethernet, wireless networking such as WIFI, HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and detection system 172 in order to control the movement, speed, etc. of vehicle 100 in accordance with the instructions 132 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The detection system 172 also includes one or more components for detecting objects external to the vehicle such as other vehicles, obstacles in the roadway, traffic signals, signs, trees, etc. For example, the detection system 170 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and detection system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 2:
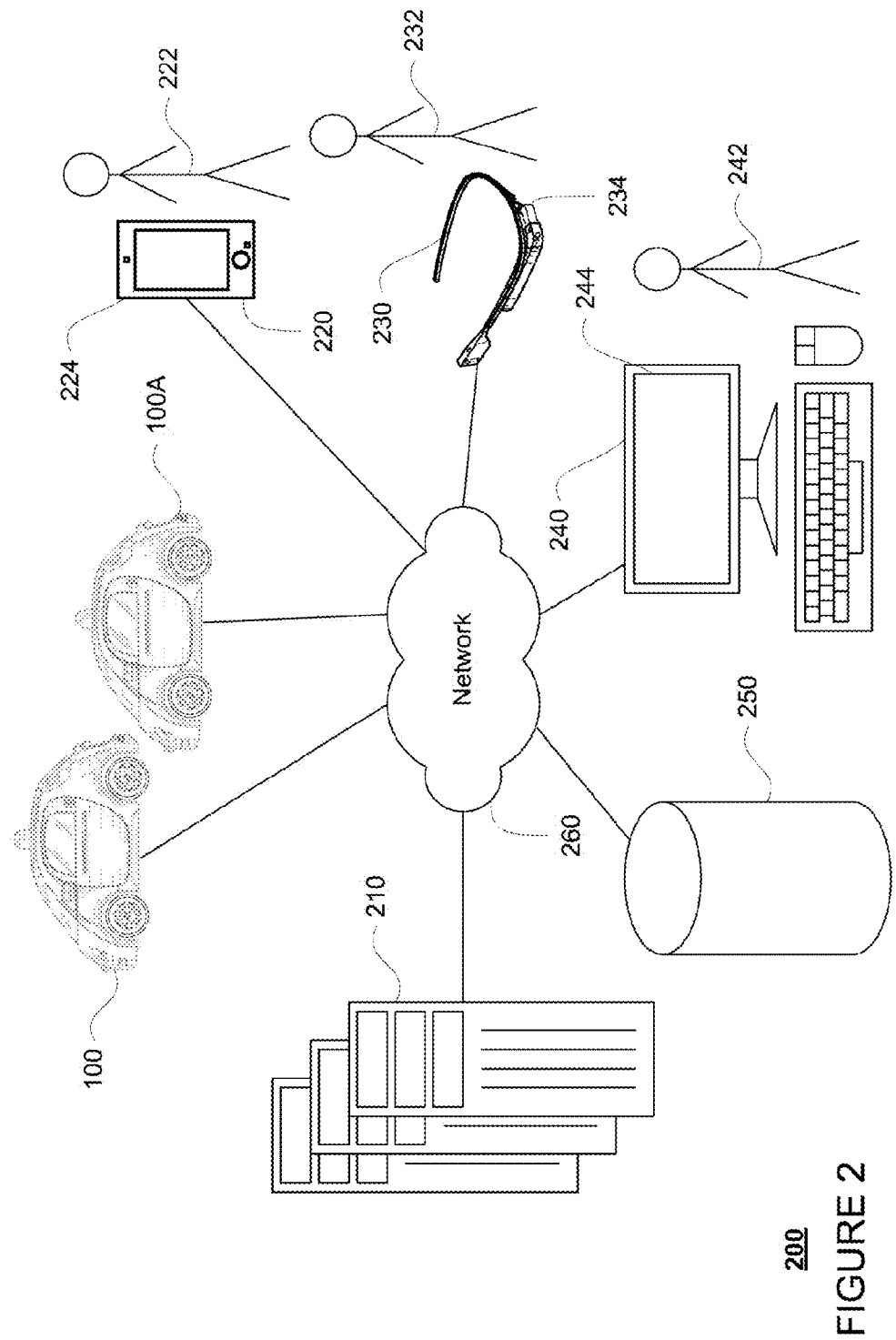
FIG. 2 is a pictorial diagram of an example system in accordance with an exemplary embodiment.
Figure 3:
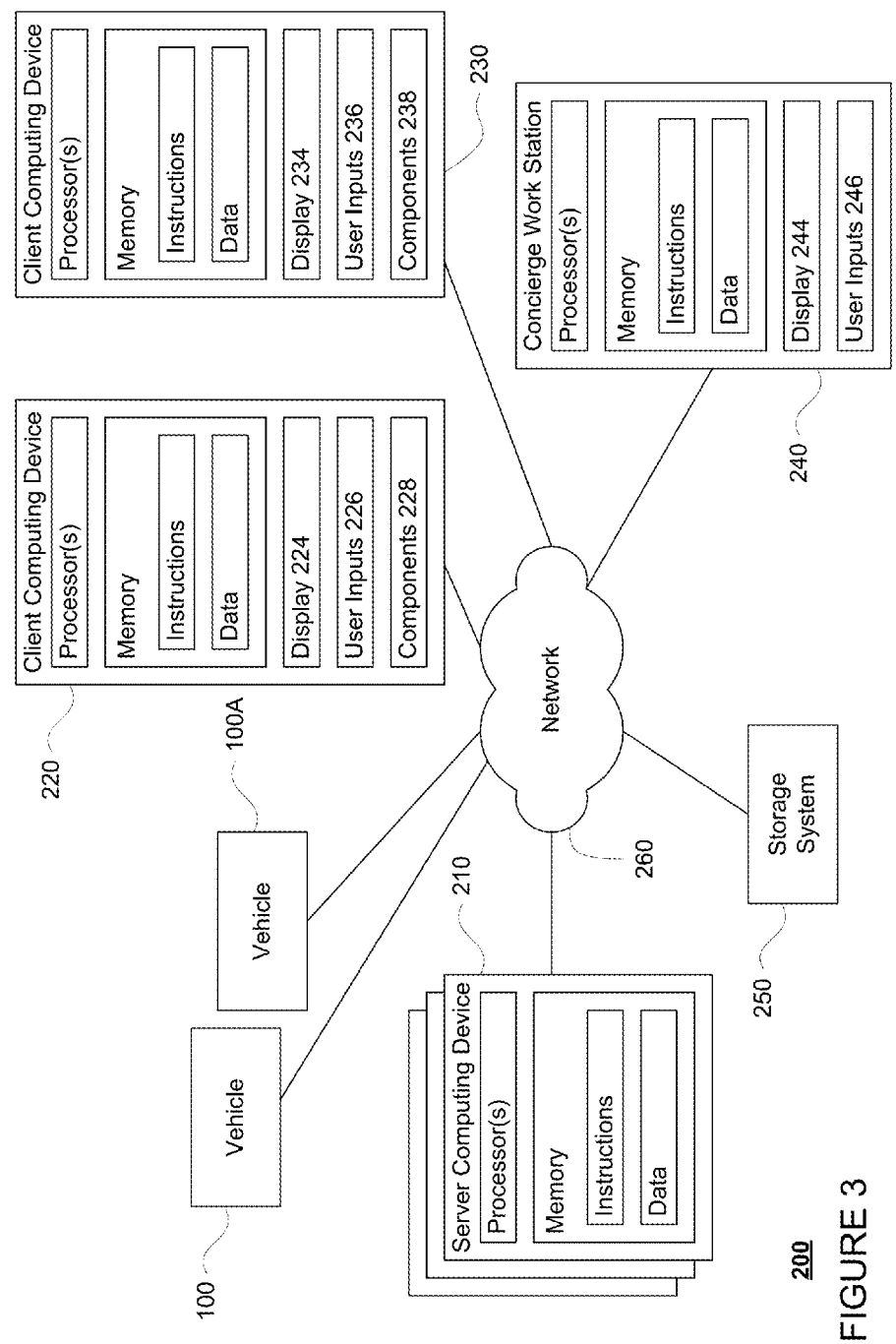
FIG. 3 is a functional diagram of the system of FIG. 2 in accordance with aspects of the disclosure.
Figure 4A:
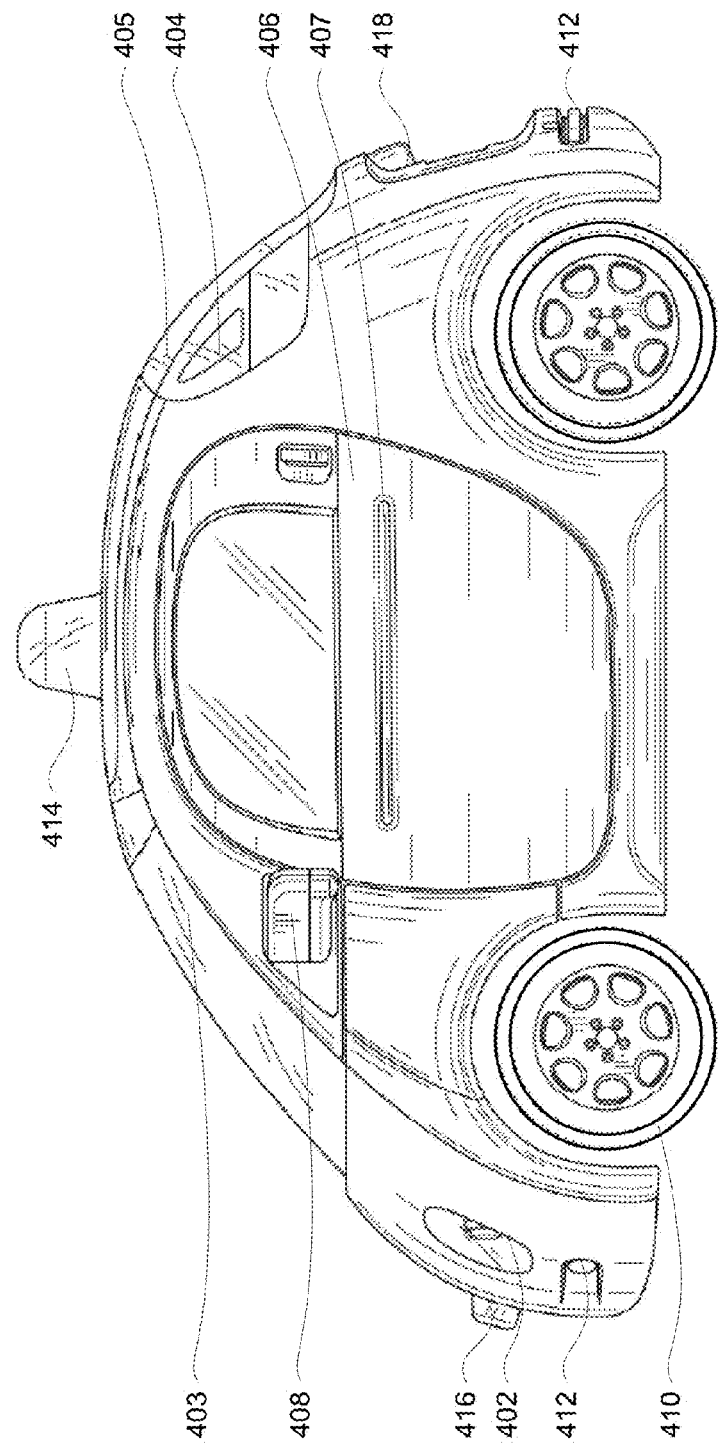
FIGS. 4A-4D are example external views of a vehicle in accordance with aspects of the disclosure.
Figure 4C:
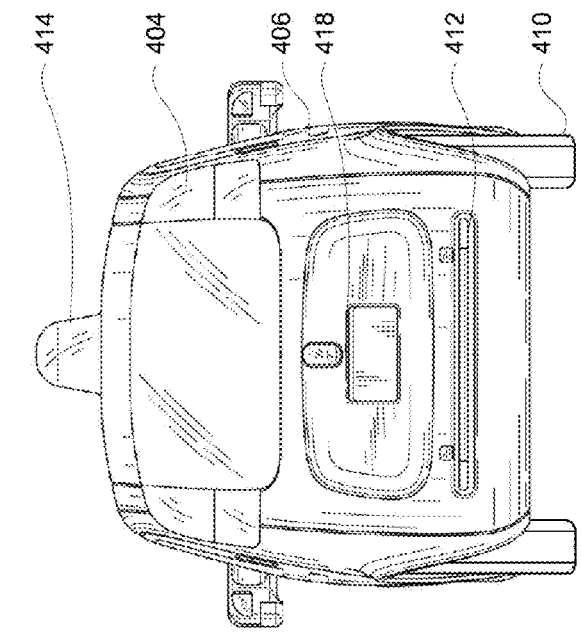
Figure 4B:
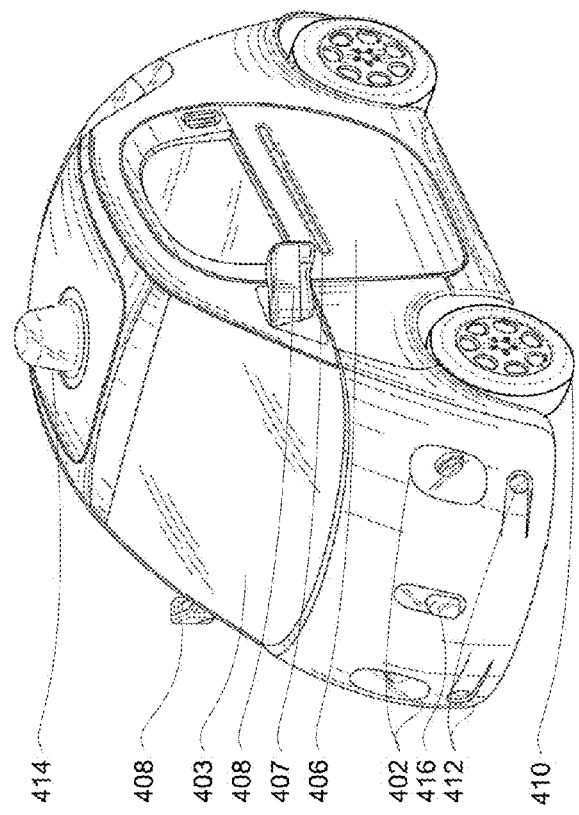
Figure 4D:
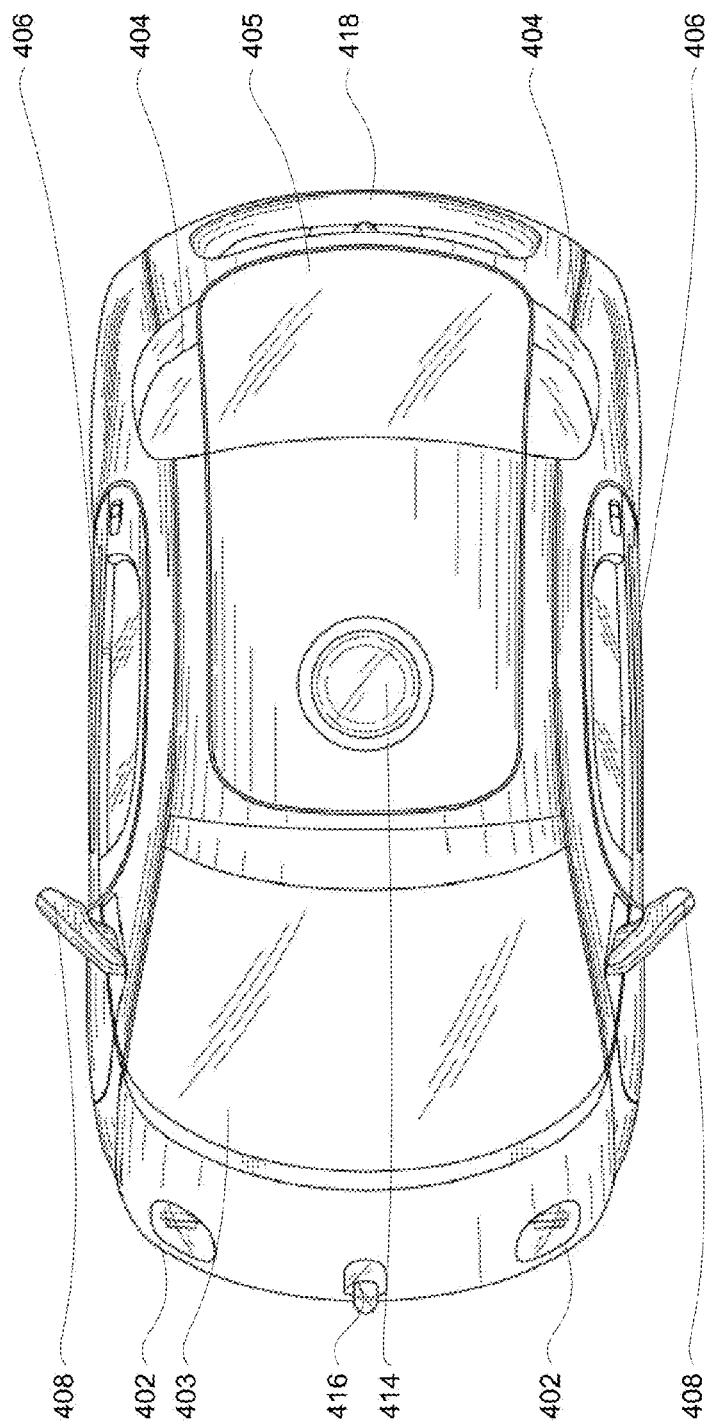

Computing device 110 of vehicle 100 may also receive or transfer information to and from other computing devices. FIGS. 2 and 3 are pictorial and functional diagrams, respectively, of an example system 200 that includes a plurality of computing devices 210, 220, 230, 240 and a storage system 250 connected via a network 260. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, 230, 240 may include one or more processors, memory, data and instructions. Such processors, memories, data and instructions may be configured similarly to one or more processors 120, memory 130, data 134, and instructions 132 of computing device 110.

The network 260, and intervening nodes, may include various configurations and protocols including short range communication protocols such as BLUETOOTH, BLUETOOTH LE, the Internet, World Wide Web, intranets, virtual private networks, wide area networks, local networks, private networks using communication protocols proprietary to one or more companies, Ethernet, wireless networking such as WIFI, HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with computing device 110 of vehicle 100 or a similar computing device of vehicle 100A as well as computing devices 220, 230, 240 via the network 260. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 210 may use network 260 to transmit and present information to a user, such as user 222, 232, 242 on a display, such as displays 224, 234, 244 of computing devices 220, 230, 240. In this regard, computing devices 220, 230, 240 may be considered client computing devices.

As shown in FIG. 3, each client computing device 220, 230, 240 may be a personal computing device intended for use by a user 222, 232, 242, and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a projector, a television, or other device that is operable to display information), and user input devices 226, 236, 246 (e.g., a mouse, keyboard, touch-screen or microphone). The client computing devices may also include a camera for recording video streams, speakers, a network interface device, and all of the components used for connecting these elements to one another.

In addition, the client computing devices 220 and 230 may also include components 228 and 238 for determining the position and orientation of client computing devices. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system, or a netbook that is capable of obtaining information via the Internet or other networks. In another example, client computing device 230 may be a wearable computing system, shown as a head-mounted computing system in FIG. 2. As an example the user may input information using a small keyboard, a keypad, microphone, using visual signals with a camera, or a touch screen.

In some examples, client computing device 240 may be a concierge work station used by an administrator to provide concierge services to users such as users 222 and 232. For example, a concierge 242 may use the concierge work station 240 to communicate via a telephone call or audio connection with users through their respective client computing devices or vehicles 100 or 100A in order to facilitate the safe operation of vehicles 100 and 100A and the safety of the users as described in further detail below. Although only a single concierge work station 240 is shown in FIGS. 2 and 3, any number of such work stations may be included in a typical system.

Storage system 250 may store various types of information as described in more detail below. This information may be retrieved or otherwise accessed by a server computing device, such as one or more server computing devices 210, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 250 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

As with memory 130, storage system 250 can be of any type of computerized storage capable of storing information accessible by the server computing devices 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 150 may be connected to the computing devices via the network 260 as shown in FIG. 2 and/or may be directly connected to or incorporated into any of the computing devices 110, 210, 220, 230, 240, etc.

FIGS. 4A-4D are examples of external views of vehicle 100. As can be seen, vehicle 100 includes many features of a typical vehicle such as headlights 402, windshield 403, taillights/turn signal lights 404, rear windshield 405, doors 406, side view mirrors 408, tires and wheels 410, and turn signal/parking lights 412. Headlights 402, taillights/turn signal lights 404, and turn signal/parking lights 412 may be associated the signaling system 166. Light bar 407 may also be associated with the signaling system 166.

Vehicle 100 also includes sensors of the detection system 172. For example, housing 414 may include one or more laser devices for having 360 degree or narrower fields of view and one or more camera devices. Housings 416 and 418 may include, for example, one or more radar and/or sonar devices. The devices of the detection system may also be incorporated into the typical vehicle components, such as taillights 404 and/or side view mirrors 408. Each of these radar, camera, and lasers devices may be associated with processing components which process data from these devices as part of the detection system 172 and provide sensor data to the computing device 110.

Figure 5:
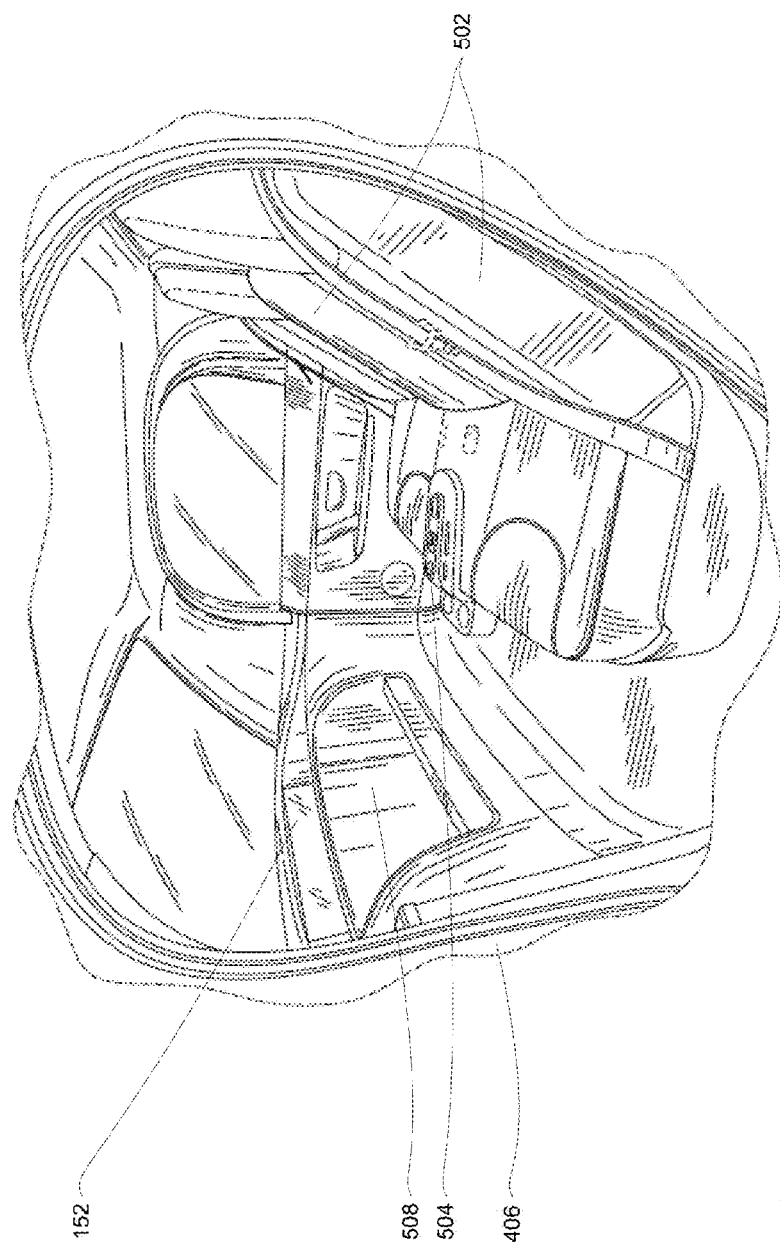
FIG. 5 is an example internal view of a vehicle in accordance with aspects of the disclosure.

FIG. 5 is an example internal view of vehicle 100 through the opening of door 406. In this example, there are two seats 502 for passengers with a console 504 between them. Directly in ahead of the seats 502 is a dashboard configuration 506 having a storage bin area 508 and the internal electronic display 152. As can be readily seen, vehicle 100 does not include a steering wheel, gas (acceleration) pedal, or brake (deceleration) pedal which would allow for a semiautonomous or manual driving mode where a passenger would directly control the steering, acceleration and/or deceleration of the vehicle via the drivetrain. Rather, as described in further detail below, user input is limited to a microphone of the user input 150 (not shown), features of the console 504, and wireless network connections 156. In this regard, internal electronic display 152 merely provides information to the passenger and need not include a touch screen or other interface for user input. In other embodiments, the internal electronic display 152 may include a touch screen or other user input device for entering information by a passenger such as a destination, etc.

Figure 6:
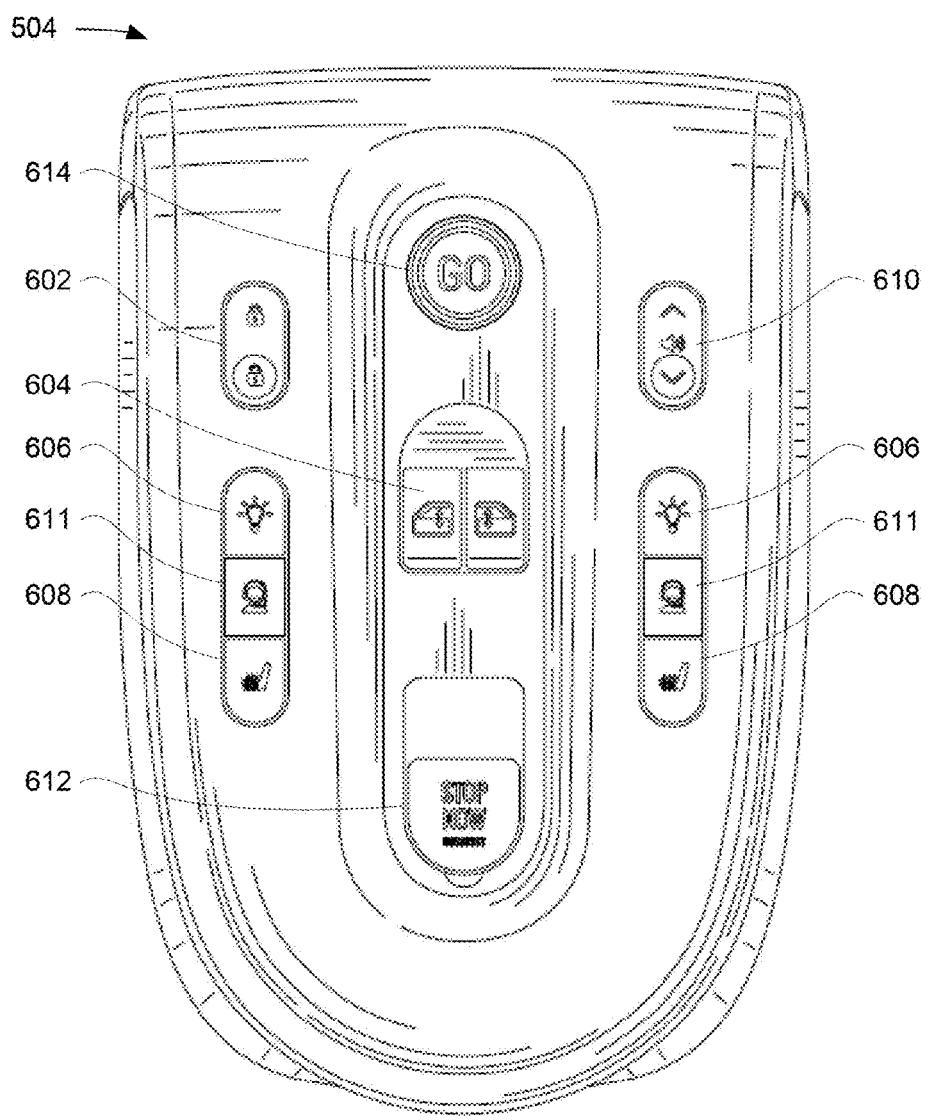
FIG. 6 is an example of a console of a vehicle in accordance with aspects of the disclosure.

FIG. 6 is a top down view of the console 504. Console 504 includes various buttons for controlling features of vehicle 100. For example, console 504 includes buttons that may be found in a typical vehicle such as buttons 602 for locking and unlocking the doors 406, buttons 604 for raising or lowering the windows of doors 406, buttons 606 for turning on internal lights of the vehicle, buttons 608 for controlling a heating function of seats 502, as well as buttons 610 for controlling the volume of speakers 154.

In addition, console 504 also includes buttons 611 for initiating communication with concierge 242 via one of the wireless network connections 156. Once the concierge work station is connected to the vehicle, the concierge may communicate with the passenger via the speakers 154 and/or internal electronic display 152. In addition, the microphone allows the passenger to speak directly to the concierge. In some cases, vehicle 100 may include an internal still or video camera that allows the concierge to view the status of the passengers and confirm their safety.

Buttons 612 and 614 may also be a part of user input 150 and in this regard, allow a passenger to communicate with computing device 110, for example, to initiate or end a trip in the vehicle. In this regard, button 612 may act as an emergency stopping button that, when pushed, causes vehicle 100 to stop in a short amount of time. Because the passenger does not have direct control of the acceleration or deceleration of vehicle 100 by way of a gas or brake pedal, button 612 may be an emergency stop button that is critical to allowing a passenger to feel safe and act quickly in case of an immediate emergency. In addition, because of the potentially abrupt nature of a stop initiated by the emergency stopping button 612, the emergency stopping button 612 may feature a cover (e.g., a clear plastic cover) that may have to be removed or flipped up in order to activate button 612.

Button 614 may be a multi-function button having different states. In the first state, button 614 may be a "GO" button which a passenger uses to initiate a trip to a destination. Once vehicle 100 is moving, button 614 may change to a "PULL OVER" button which a passenger users to initiate a non-emergency stop. In this regard, computing device 110 may respond by determining a safe place to pull the vehicle over, rather than coming to a more sudden stop as with the emergency stop button 612. Alternatively, two buttons, one having a "GO" state and the other having a "PULL OVER" state may be used.

Thus, passenger communication with computing device 110 for navigation purposes may be limited to button 614 (or two buttons as in the example above), emergency stopping button 612, wireless network connection 156 (such as Bluetooth LE) with the passenger's client computing device, and by sending information from the passenger's client computing device to the server 210 which then relays that information to the vehicle's computing device. In some examples, a passenger may provide information to the vehicle's computing device 110 via voice commands though the microphone as discussed above. In addition, however, the passenger may communicate with the concierge via a phone call, an application on the passenger's client computing device, a microphone, and/or the concierge button 611 and in turn, the concierge may provide instructions control certain aspects of a vehicle via a concierge work station.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 222 and 232 may download the application via a link in an email, directly from a website, or an application store to client computing devices 220 and 230. For example, client computing device may transmit a request for the application over the network, for example, to one or more server computing devices 210, and in response, receive the application. The application may be installed locally at the client computing device.

The user may then use his or her client computing device to access the application and request a vehicle. As an example, a user such as user 232 may use client computing device 230 to send a request to one or more server computing devices 210 for a vehicle. The request may include information identifying a pickup location or area and/or a destination location or area. As an example, such location may be identified by street addresses, location coordinates, points of interest, etc. In response the one or more server computing devices 210 may identify and dispatch, for example based on availability and location, a vehicle to the pickup location. This dispatching may involve sending information to the vehicle identifying the user (and/or the user's client device), the pickup location, and the destination location or area.

Figure 7:
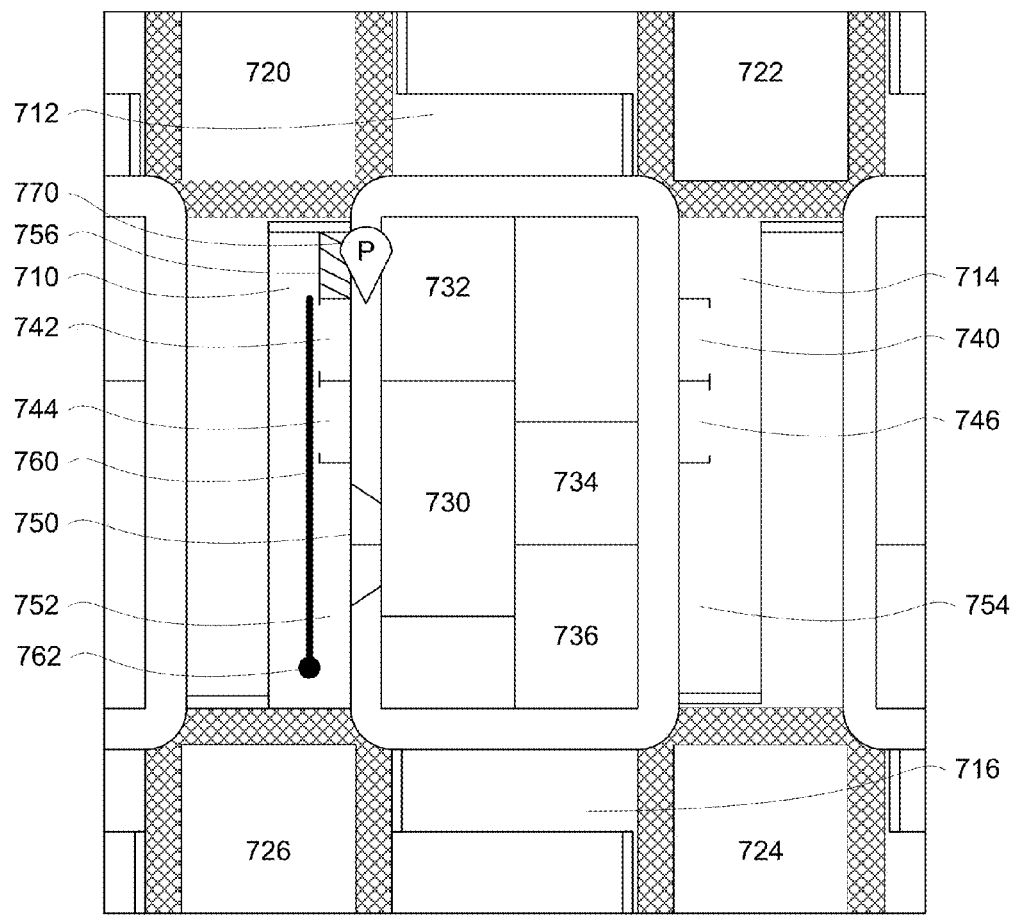
FIG. 7 is an example map in accordance with aspects of the disclosure.

FIG. 7 is an example of a map 700. In this example, the map includes a plurality of different features that identify the shape and location of various features such as lanes 710-716, intersections 720-726, buildings 730-736, parking spaces 740-746, a driveway entrance (for example to a parking garage or other location) 750, shoulder areas 752-754, and no parking zone 756. Together, these features correspond to a single city block. The map 700 may be a part of the detailed maps described above and used by the various computing devices of vehicle 100 in order to maneuver the vehicle 100.

Once the vehicle 100 receives the information dispatching the vehicle, the vehicle's computing device 110 may use the map 700 to identify the pickup location relative to the current location of the vehicle. For example, map 700 also includes a map pointer 770 corresponding to a pickup location P for user 232 and/or client device 230. The vehicle's computing device 110 may then maneuver the vehicle towards the pickup location using the various features described above.

At the same time, a notification may be provided to the user's client computing device indicating an estimated time of arrival for the vehicle. For example, the computing devices 110 may use the routing information of storage system 150 in order to estimate how long it will take the vehicle 100 to maneuver along a route from the vehicle's current location to the pickup location. This information may then be used to generate a notification. In one instance, the notification may be generated by the vehicle's computing devices 110 and sent to the user's client computing device. For example, the computing devices 110 may send a notification to the client computing device 230 including an estimated time of arrival for the vehicle at the pickup location. Alternatively, the computing devices may first send the notification to the server computing devices 210 which forward the notification to the client computing device. In another alternative, the notification may be generated by the server computing devices 210 based on an estimated time of arrival and/or a current location of the vehicle 100 received from the vehicle. Once received by the client computing device, the notification may then be displayed to the user 232 on the display of the client computing device 230.

Figure 8:
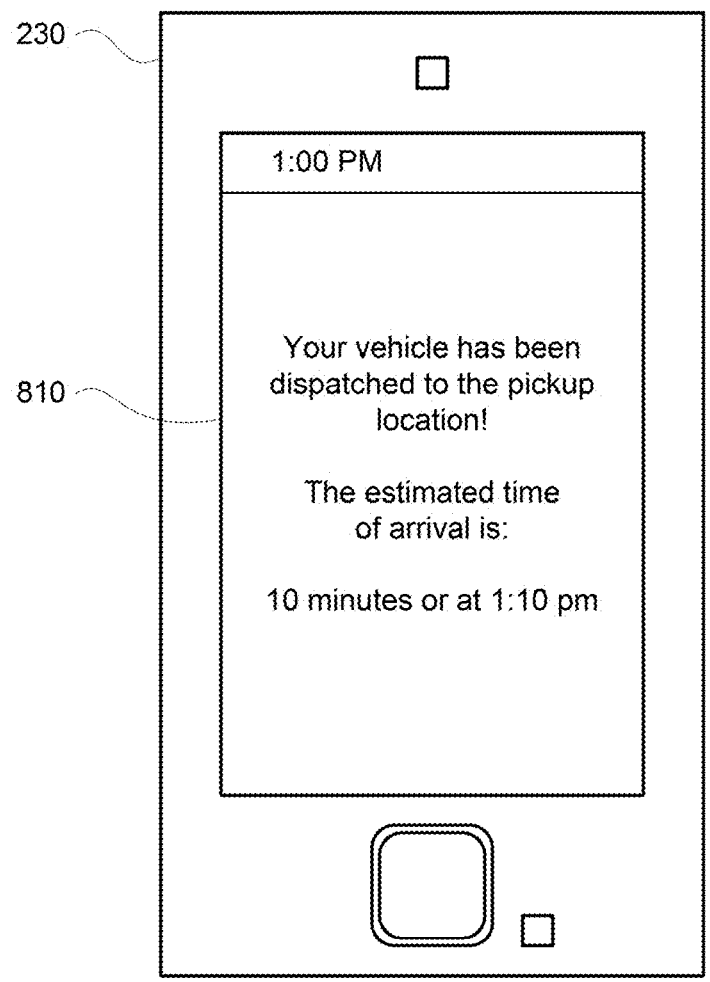
FIG. 8 is an example client computing device and notification in accordance with aspects of the disclosure.

FIG. 8 is an example 800 of a notification 810 displayed on the display of client computing device 230. Notification 810 indicates that vehicle 100 should be arriving at the pickup location in 10 minutes or at 1:10 pm. The notification may be arranged in any configuration that provides the user with the estimated time of arrival information.

Once the vehicle is within a threshold distance in time or space from or to the pickup location the vehicle's computing devices, another notification may be provided to the client computing device. As an example, this distance may be 1 minute or more or less or 0.5 miles or more or less from the pickup location along the route. Returning to FIG. 7, if the vehicle 100 were to approach the pickup location P from lane 710 (traveling away from intersection 726 and towards intersection 720), line 760 represents a threshold distance in time or space from location 762 to the pickup location P. In other words, when the vehicle 100 reaches the physical location of location 762 in map 700, the notification may be provided to the client computing device of the user.

Figure 9:
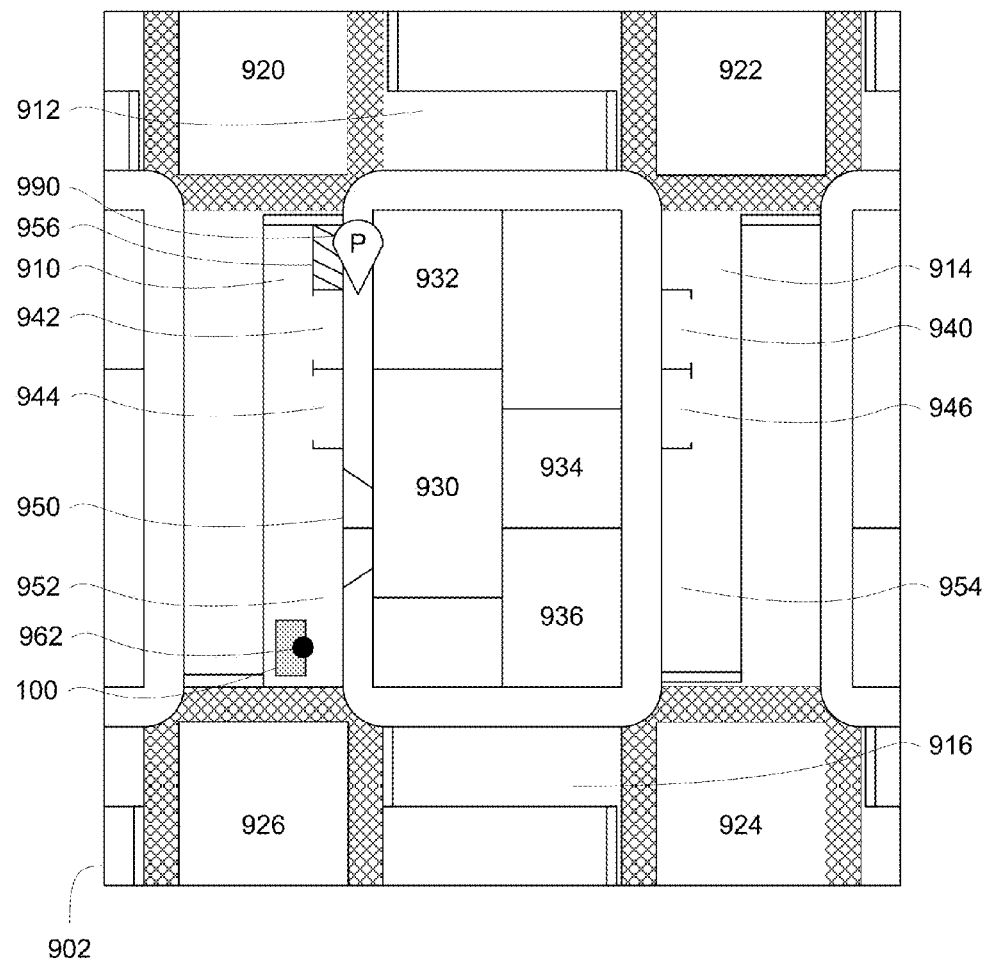
FIG. 9 is another example bird's eye view of a geographic area in accordance with aspects of the disclosure.

FIG. 9 is an example of a bird's eye view 900 of an geographic area 902 corresponding to the area of map 700. In this example, the geographical area includes various features such as lanes 910-916, intersections 920-926, buildings 930-936, parking spaces 940-946, a driveway entrance (for example to a parking garage or other location) 950, shoulder areas 952-954, and no parking zone 956 that correspond to each of lanes 710-716, intersections 720-726, buildings 730-736, parking spaces 740-746, a driveway entrance (for example to a parking garage or other location) 750, shoulder areas 752-754, and no parking zone 756 of the map 700. In this example, map pin 990 is for reference only and identifies the physical location of pickup location P. Similarly, point 962 is for reference only and identifies the physical location of location 762. Thus, once the vehicle 100 reaches point 962 in lane 910 (traveling away from intersection 926 and towards intersection 920) as shown in FIG. 9, the second notification may be provided to the client computing device.

This notification may indicate that the vehicle will be arriving in some estimated amount of time or has actually arrived. As with the notification above, this second notification may be generated by the vehicle's computing devices 110 and sent to the user's client computing device. Alternatively, the computing devices may first send the notification to the server computing devices 210 which forward the notification to the client computing device. In another alternative, the notification may be generated by the server computing devices 210 based on an estimated time of arrival and/or location information received from the computing device 110 of the vehicle 100. Again, once received by the client computing device, this second notification may then be displayed to the user 232 on the display of the client computing device.

Figure 10:
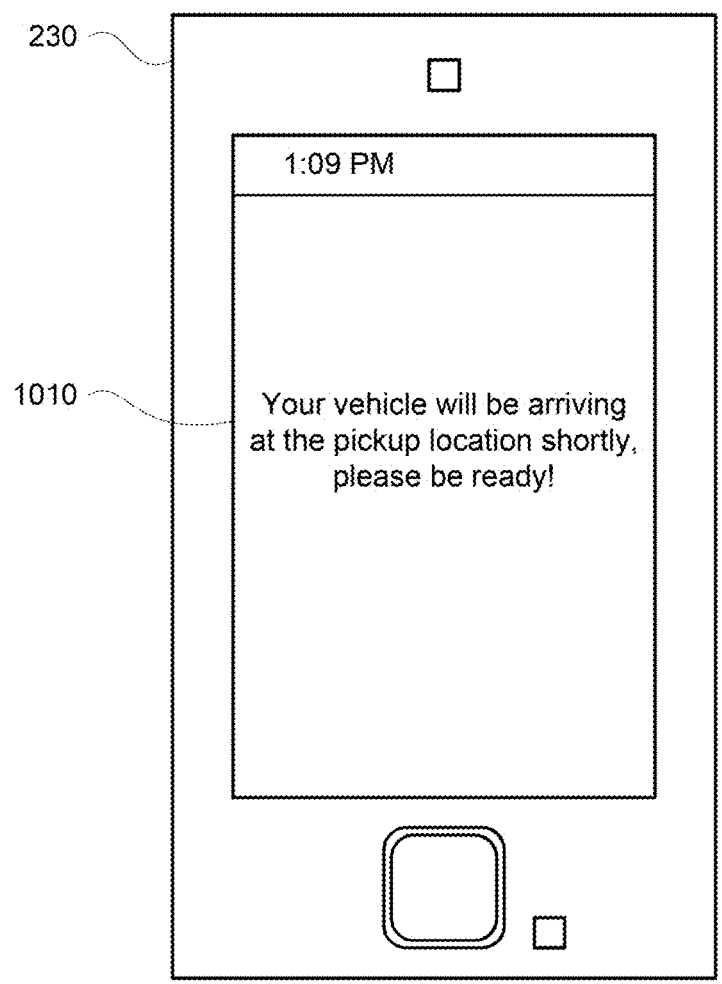
FIG. 10 is another example client computing device and notification in accordance with aspects of the disclosure.

FIG. 10 is an example 1000 of a notification 1010 displayed on the display of client computing device 230. Notification 1010 indicates that vehicle 100 should be arriving at the pickup location shortly. The notification may be arranged in any configuration that provides the user with information indicating that the vehicle will be arriving soon or has already arrived at the pickup location (even where the vehicle has not already done so).

Figure 11:
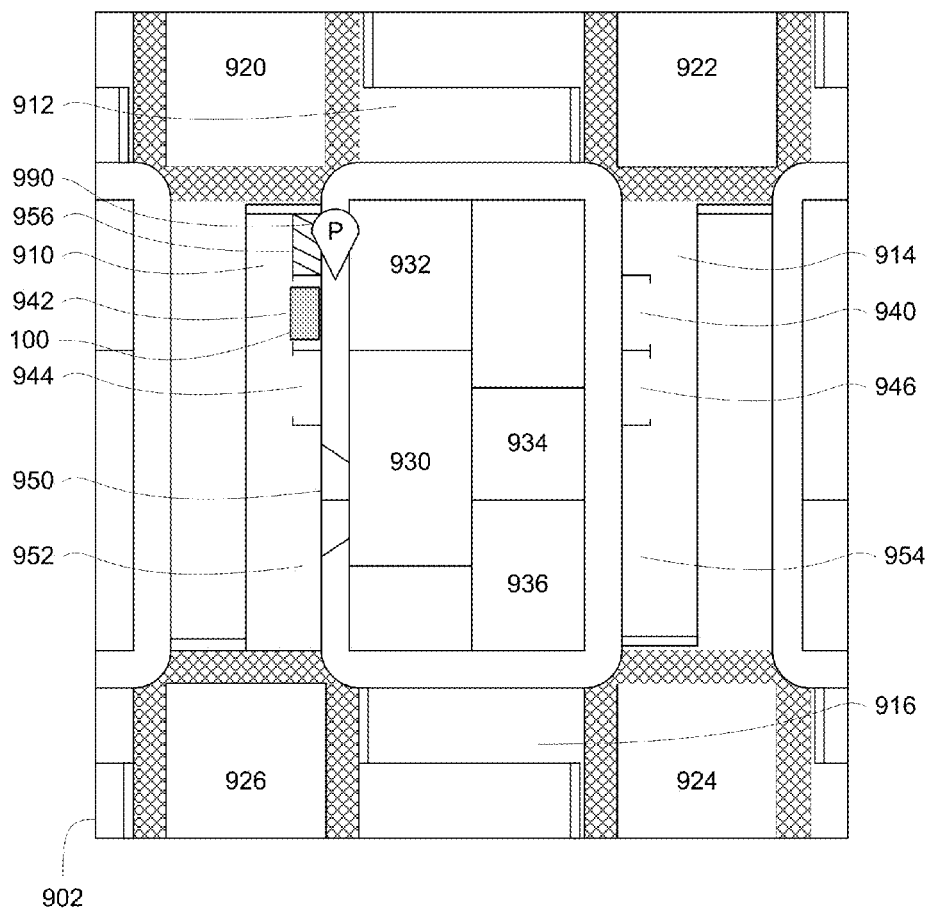
FIG. 11 is another example bird's eye view of a geographic area in accordance with aspects of the disclosure.

Once the vehicle is within a threshold distance in time or space from or to the pickup location the vehicle's computing devices may attempt to look for an area in which the vehicle can stop and wait for the user. These areas may include any reasonable location where the vehicle can wait for the user such as a designated parking spot, an area of a lane (if safe to do so), a no parking zone such as in front of a driveway or over no parking lines (if safe to do so), etc. This distance may be, for example, along the route that the vehicle is currently following to reach the pickup location. In addition, the threshold distance may be defined as a distance before or after the vehicle has passed the pickup location. In the example 1100 of FIG. 11, vehicle 100 has come to a stop in parking spot 942. In this example, the distance between the vehicle 100 and the pickup location P may be relatively short, such as 5 meters.

Once the vehicle has parked or come to a stop, the vehicle's computing devices may initiate a countdown. As an example, this countdown may be a predetermined amount of time, such as 2 minutes or more or less, to allow the user ample time to reach the vehicle. During this countdown time, the vehicle will try to authenticate the user (or rather, the user's client computing device), for example, via a Bluetooth or other communication link with the passenger's client computing device. Any known authentication method may be used such as sending unique keys provided by the server computing devices 210, preparing the client computing device and the vehicle, etc. If the user's client computing device is authenticated, the doors of the vehicle may unlock, the passenger may enter the vehicle, and the vehicle may begin the trip to the destination location.

If the vehicle is unable to authenticate the user's client computing device during the countdown, the client computing device may be provided with a third notification. This third notification may indicate that the vehicle is about to leave. The timing of the third notification may coincide with an predetermined amount of time left in the countdown. As an example, the third notification may be provided half way through the countdown, after a fixed amount of time has passed or some predetermined amount of time before the end of the countdown. For example, the third notification may be provided when there is only 1 minute left in the countdown.

As with the notifications above, this third notification may be generated by the vehicle's computing devices 110 and sent to the user's client computing device. Alternatively, the computing devices may first send the notification to the server computing devices 210 which forwards the notification to the client computing device. In another alternative, the notification may be generated by the server computing devices 210 based on information about the start of or the current amount of time left in the count down received from the computing device 110 of the vehicle 100. Again, once received by the client computing device, this third notification may then be displayed to the user 232 on the display of the client computing device.

Figure 12:
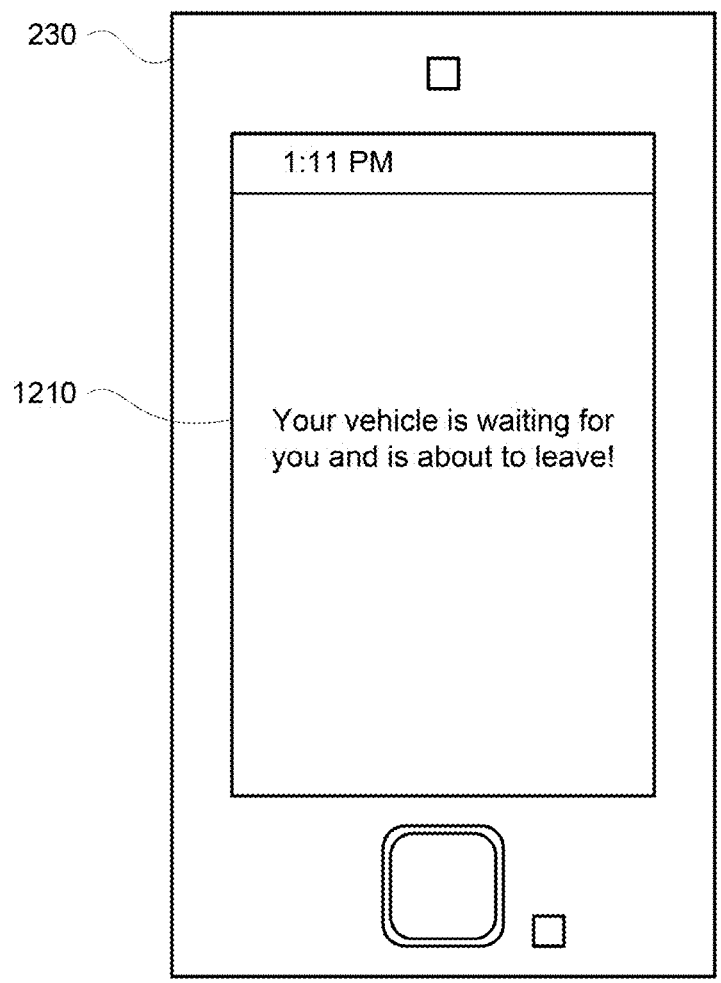
FIG. 12 is further example client computing device and notification in accordance with aspects of the disclosure.

FIG. 12 is an example 1200 of a notification 1210 displayed on the display of client computing device 230. Notification 1210 indicates that vehicle 100 is about to leave. The notification may be arranged in any configuration that provides the user with information indicating that the vehicle is about to leave or has left (even where the vehicle has not already done so).

If after this third notification, the vehicle has still not yet authenticated the user's client computing device after some additional time has passed in the countdown, a fourth notification may be provided to the client computing device. In addition, once the countdown has ended and the fourth notification has been provided, the vehicle's computing devices may maneuver the vehicle away from the location of the stop without the user.

The fourth notification may indicate to the user that the trip has been cancelled or that the vehicle will no longer be waiting for or picking up the user. Of course, the user may schedule a new trip and another vehicle (or the same vehicle) may be dispatched to pick up the user as described above. As with the third notification, the timing of the fourth notification may coincide with an amount of time left in the countdown. As an example, the fourth notification may be provided half way through the countdown, after a fixed amount of time has passed or some predetermined amount of time before the end of the countdown. For example, the fourth notification may be provided when there is only 10 seconds left in the countdown or after the countdown has ended.

As with the notifications above, this fourth notification may be generated by the vehicle's computing devices 110 and sent to the user's client computing device. Alternatively, the computing devices may first send the notification to the server computing devices 210 which forwards the notification to the client computing device. In another alternative, the notification may be generated by the server computing devices 210 based on information about the start of or the current amount of time left in the count down received from the computing device 110 of the vehicle 100. Again, once received by the client computing device, this third notification may then be displayed to the user 232 on the display of the client computing device.

Figure 13:
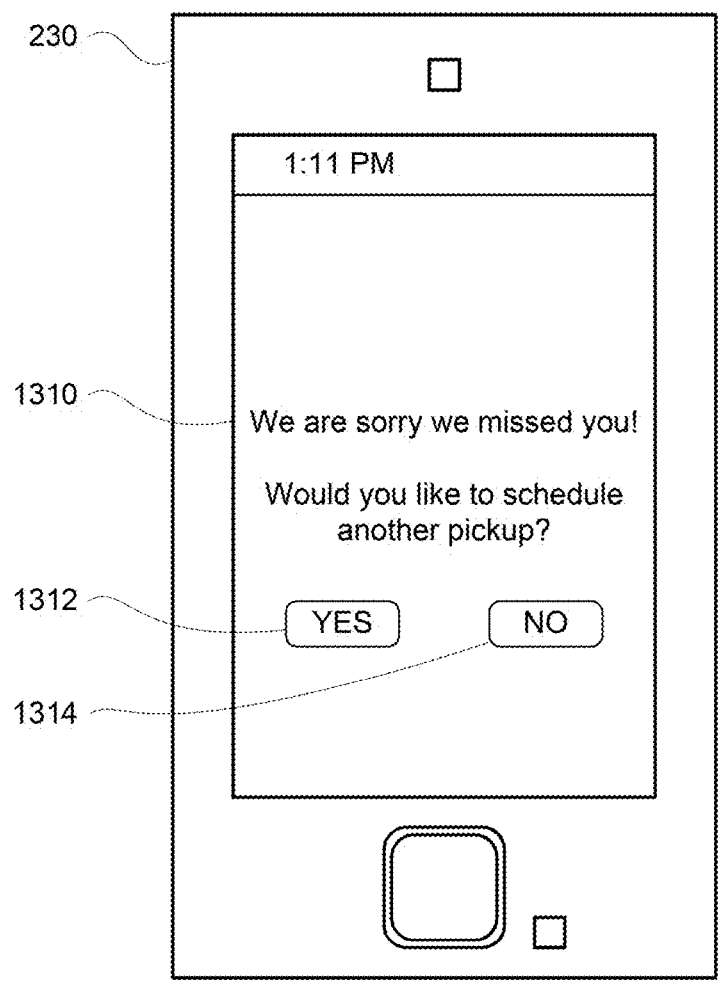
FIG. 13 is example client computing device and notification in accordance with aspects of the disclosure.

FIG. 13 is an example 1300 of a notification 1310 displayed on the display of client computing device 230. Notification 1310 indicates that the user's trip has been cancelled. In this example, notification 1310 also provides the user with option 1312 which may offer the ability to schedule another pickup and 1314 which may allow the user to decline the offer to schedule another pickup. The notification may be arranged in any configuration that provides the user with information indicating that the trip has been cancelled.

Once the fourth notification has been sent, the vehicle may be moved from the stopped location by the vehicle's computing devices. In addition, the vehicle may be dispatched to pick up a different or the same user. Alternatively, if safe to do so, such as where the vehicle is located in a parking spot, the vehicle may remain stopped until the vehicle's computing devices receive further instructions from the server computing devices, for example, dispatching the vehicle to proceed to another pick up location.

Figure 14:
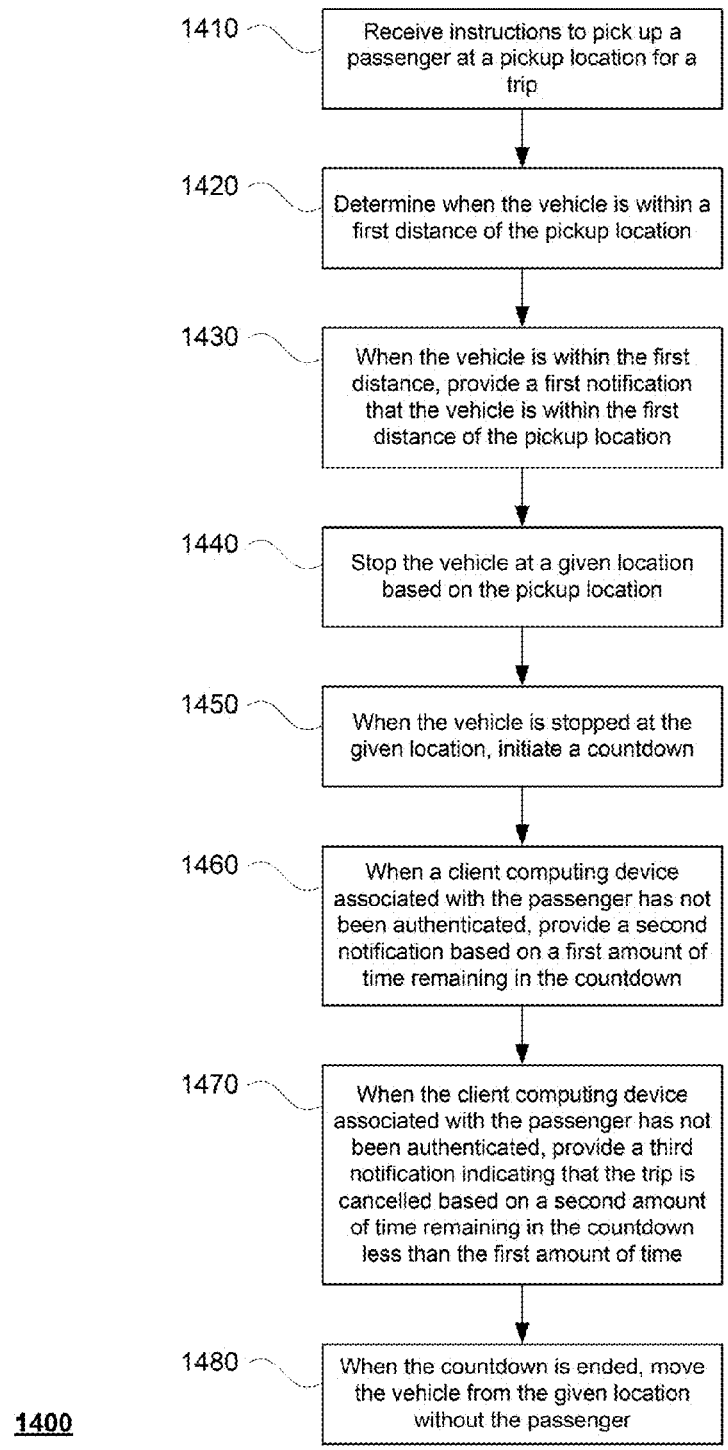
FIG. 14 is an example flow diagram in accordance with aspects of the disclosure.

FIG. 14 is an example flow diagram 1400 in accordance with some of the aspects described above that may be performed by one or more computing devices such as server computing devices 110. In this example, instructions are received to pick up a passenger at a pickup location for a trip at block 1410. When the vehicle is within a first distance of the pickup location is determined at block 1420. When the vehicle is within the first distance, a first notification that the vehicle is within the first distance of the pickup location is provided at block 1430. The vehicle is stopped at a given location based on the pickup location at block 1440. When the vehicle is stopped at the given location, a countdown is initiated at 1450. When a client computing device associated with the passenger has not been authenticated within a first amount of time remaining in the countdown, a second notification is provided at block 1460. When the client computing device associated with the passenger has not been authenticated within a second amount of time remaining in the countdown less than the first amount of time, a third notification indicating that the trip is cancelled is provided at block 1470. When the third notification is provided, the vehicle is moved from the given location without the passenger at block 1480.

In the event that the user's client computing device is authenticated during the countdown, the vehicle's computing devices may stop the countdown. The vehicle's computing devices may also unlock the vehicle's doors and wait for the user to enter the vehicle. Once inside, the vehicle's computing devices may initiate the trip and maneuver the vehicle to the destination location.

If at any time during the countdown the vehicle must move from the current location where the vehicle is stopped, the user may receive a fifth notification that the vehicle has had to move. As an example, this may be the result of an emergency vehicle in the area, heavy traffic, aggressive drivers, aggressive actions towards the car, or if the vehicle has blocked in a parking spot or driveway where someone is waiting to leave or enter. At this time, the user may also receive information about when the vehicle will be arriving again via the second notification as described above. Once the vehicle has parked again, the countdown may be restarted and the third and fourth notifications provided as needed as described above.

In some examples, the user may also have the ability via the user's client computing device to request more time to reach the vehicle, for example, if the user is running late. This may be achieved using a gesture, such as triple tap on the display of the client computing device may be used as input by the application to request additional time or by selecting an option within an application. In some examples, the user may be able to request more time any time after receiving the second notification until receiving the fourth notification. There may also be a limit on the amount of time or number of requests made based on safety, availability of vehicles to other users, etc.

In addition, depending upon the amount of time requested by the user, the server computing devices may choose to allow the vehicle to wait the extra time by adjusting the countdown time, send another vehicle, or cancel the trip. For example, if the user needs only 1 or 2 more minutes, the vehicle may continue to wait. However, if the user needs 10 minutes or more, it may be more efficient to send another vehicle or cancel the trip if there are other trips scheduled that could be affected by the delay.

In another example, if the vehicle is unable to stop at the pickup location for reasons of safety, road closures, parking availability, etc., the vehicle may attempt to stop a short distance away. In doing so, the user may receive another notification identifying the new pickup location where the vehicle has stopped. In addition, because the user may have to walk to the new pickup location, the countdown may be extended, for example 1 minute or more, to allow the user sufficient time to walk to the new pickup location. Of course, if the user has not yet received the first notification, he or she may be able to simply adjust the time of the pickup to a more convenient time.

In addition to the notifications described above, an additional notification may be provide to the client computing device when the vehicle has stopped and begun waiting for the user. This notification may indicate to the user that the vehicle has in fact stopped to wait for the user and may provide additional information. As an example, this additional information may include an image captured by a camera of the vehicle. The image may be one of a series of images captured by the vehicle as it pulls into the location of the stop. Relevant images, such as that those that include recognizable features such as buildings as opposed to other vehicles (which may tend to move), may be selected by using, for example, laser distance measurements from the vehicle's detection system. Alternatively, a street level image of where the vehicle is located captured from at a previous point in time may be included in the notification. Such images may be retrieved from a remote or local database of images and may depict a local storefront that's visible from further away than the vehicle is. This may help the user to find the vehicle.

As with the notifications above, this third notification may be generated by the vehicle's computing devices 110 and sent to the user's client computing device. Alternatively, the computing devices may first send the notification to the server computing devices 210 which forwards the notification to the client computing device. In another alternative, the notification may be generated by the server computing devices 210 based on an image received from the computing device 110 of the vehicle 100 or retrieved from a database of street level or other images as described above. Again, once received by the client computing device, this third notification may then be displayed to the user 232 on the display of the client computing device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   receiving, by one or more computing devices of an autonomous vehicle, instructions to pick up a passenger at a pickup location for a trip, the passenger being associated with a client computing device;
   determining, by the one or more computing devices, when the vehicle is within a first distance of the pickup location;
   when the vehicle is within the first distance, providing, by the one or more computing devices, a first notification that the vehicle is within the first distance of the pickup location to the client computing device;
   stopping, by the one or more computing devices, the vehicle at a given location based on the pickup location;
   when the vehicle is stopped at the given location, initiating, by the one or more computing devices, a countdown;
   attempting, by the one or more computing devices, to authenticate the client computing device during the countdown in order to establish a communication link between the client computing device and the vehicle;

when the one or more computing devices are unable to authenticate the client computing device and only a first amount of time is remaining in the countdown, providing, by the one or more computing devices, a second notification to the client computing device based on the first amount of time remaining in the countdown;

after the second notification is provided, when the one or more computing devices are unable to authenticate the client computing device and only a second amount of time is remaining in the countdown, providing, by the one or more computing devices, a third notification to the client computing device indicating that the trip is cancelled based on the second amount of time remaining in the countdown, wherein the second amount of time remaining in the countdown is less than the first amount of time remaining in the countdown; and once the countdown has completed, moving, by the one or more computing devices, the vehicle from the given location without the passenger.

2. The method of claim 1, wherein the first distance correlates to an amount of time for the vehicle to reach the pickup location.

3. The method of claim 1, wherein the second notification indicates that the vehicle is preparing to leave the given location.

4. The method of claim 1, further comprising:
before the countdown is completed, determining that the vehicle must leave the given location; and
moving the vehicle from the given location before the countdown has completed.

5. The method of claim 4, further comprising:
after moving the vehicle from the given location before the countdown is completed, stopping, by the one or more computing devices, the vehicle based on the pickup location; and
when the vehicle is stopped after moving the vehicle from the given location before the countdown is completed, restarting the countdown.

6. The method of claim 1, further comprising, before starting the countdown, determining a length of time for the countdown based on a distance between the pickup location and the given location.

7. The method of claim 1, further comprising:
receiving a request for more time initiated by the client computing device; and
adjusting an amount of time remaining in the countdown based on the request.

8. The method of claim 1, further comprising, before moving the vehicle, waiting until second instructions to pick up a second passenger at a second pickup location for a second trip are received by the one or more computing devices.

9. A system comprising one or more computing devices, the one or more computing devices being configured to:
receive instructions to pick up a passenger at a pick-up location for a trip, the passenger being associated with a client computing device;
determine when an autonomous vehicle is within a first distance of the pickup location;
when the vehicle is within the first distance, provide a first notification that the vehicle is within the first distance of the pickup location to the client computing device;
stop the vehicle at a given location based on the pickup location;
when the vehicle is stopped at the given location, initiate a countdown;
attempt to authenticate the client computing device during the countdown in order to establish a communication link between the client computing device and the vehicle;
when the one or more computing devices are unable to authenticate the client computing device and only a first amount of time is remaining in the countdown, provide a second notification to the client computing device based on the first amount of time remaining in the countdown;
after the second notification is provided, when the one or more computing devices are unable to authenticate the client computing device and only a second amount of time is remaining in the countdown, provide a third notification to the client computing device indicating that the trip is cancelled based on the second amount of time remaining in the countdown, the second amount of time remaining in the countdown is less than the first amount of time remaining in the countdown; and
once the countdown has completed, move the vehicle from the given location without the passenger.

10. The system of claim 9, wherein the first distance correlates to an amount of time for the vehicle to reach the pickup location.

11. The system of claim 9, wherein the second notification indicates that the vehicle is preparing to leave the given location.

12. The system of claim 9, wherein the one or more computing devices are further configured to:
before the countdown is completed, determine that the vehicle must leave the given location; and
move the vehicle from the given location before the countdown has completed.

13. The system of claim 12, wherein the one or more computing devices are further configured to:
after moving the vehicle from the given location before the countdown has completed, stop the vehicle based on the pickup location; and
when the vehicle is stopped the second time after moving the vehicle from the given location before the countdown has completed, restart the countdown.

14. The system of claim 9, wherein the one or more computing devices are further configured to, before starting the countdown, determine a length of time for the countdown based on a distance between the pickup location and the given location.

15. The system of claim 9, wherein the one or more computing devices are further configured to:
receive a request for more time initiated by the client computing device; and
adjust an amount of time remaining in the countdown based on the request.

16. The system of claim 9, further comprising the vehicle.

17. The system of claim 9, wherein the one or more computing devices, before moving the vehicle, are further configured to wait until second instructions to pick up a second passenger at a second pickup location for a second trip are received by the one or more computing devices.

18. A non-transitory computer-readable medium on which instructions are stored, the instructions, when executed by one or more processors cause the one or more processors to perform a method, the method comprising:
receiving instructions to pick up a passenger at a pickup location for a trip, the passenger being associated with a client computing device;

determining when an autonomous vehicle is within a first distance of the pickup location;

when the vehicle is within the first distance, providing a first notification to the client computing device that the vehicle is within the first distance of the pickup location;

stopping the vehicle at a given location based on the pickup location;

when the vehicle is stopped at the given location, initiating a countdown;

attempting to authenticate the client computing device during the countdown in order to establish a communication link between the client computing device and the vehicle;

when the one or more processors are unable to authenticate the client computing device and only a first amount of time is remaining in the countdown, providing a second notification to the client computing device based on the first amount of time remaining in the countdown;

when the one or more processors are unable to authenticate the client computing device and only a second amount of time is remaining in the countdown, providing a third notification to the client computing device indicating that the trip is cancelled based on the second amount of time remaining in the countdown, wherein the second amount of time remaining in the countdown is less than the first amount of time remaining in the countdown; and once the countdown has completed, moving the vehicle from the given location without the passenger.

19. The medium of claim 18, wherein the method further comprises:

before the countdown is completed, determining that the vehicle must leave the given location; and moving the vehicle from the given location before the countdown has completed.

20. The medium of claim 19, wherein the method further comprises:

after moving the vehicle from the given location before the countdown is completed, stopping the vehicle based on the pickup location; and when the vehicle is stopped after moving the vehicle from the given location before the countdown is completed, restarting the countdown.

* * * * *